(12) United States Patent
Ueda et al.

(10) Patent No.: US 9,340,201 B2
(45) Date of Patent: May 17, 2016

(54) ENGINE OPERATION CONTROL DEVICE FOR HYBRID VEHICLE

(71) Applicant: Mitsubishi Jidosha Kogyo Kabushiki Kaisha, Tokyo (JP)

(72) Inventors: Katsunori Ueda, Okazaki (JP); Sumio Tanaka, Okazaki (JP); Shigetoshi Hirano, Toyoake (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 14/139,413

(22) Filed: Dec. 23, 2013

(65) Prior Publication Data

US 2014/0195084 A1 Jul. 10, 2014

(30) Foreign Application Priority Data

Jan. 9, 2013 (JP) .................... 2013-001913

(51) Int. Cl.
| | |
|---|---|
| *B60W 20/00* | (2006.01) |
| *B60W 40/02* | (2006.01) |
| *B60W 10/06* | (2006.01) |
| *B60K 6/442* | (2007.10) |
| *F02D 29/06* | (2006.01) |
| *F02D 31/00* | (2006.01) |

(52) U.S. Cl.
CPC .............. *B60W 20/20* (2013.01); *B60K 6/442* (2013.01); *B60W 10/06* (2013.01); *B60W 2550/12* (2013.01); *B60W 2550/13* (2013.01); *B60W 2710/0644* (2013.01); *F02D 29/06* (2013.01); *F02D 31/001* (2013.01); *F02D 2200/0414* (2013.01); *F02D 2200/10* (2013.01); *F02D 2200/1006* (2013.01); *F02D 2200/703* (2013.01); *Y02T 10/6217* (2013.01); *Y02T 10/6234* (2013.01); *Y02T 10/6265* (2013.01); *Y02T 10/6286* (2013.01); *Y10S 903/93* (2013.01)

(58) Field of Classification Search
CPC ................. B60W 2550/13; B60W 2550/145; F02D 2200/703
See application file for complete search history.

(56) References Cited

U.S. PATENT DOCUMENTS

| | | | | |
|---|---|---|---|---|
| 5,993,351 | A | * 11/1999 | Deguchi et al. | ........... 477/5 |
| 6,853,893 | B2 | * 2/2005 | Corcione et al. | ......... 701/22 |

(Continued)

FOREIGN PATENT DOCUMENTS

| | | |
|---|---|---|
| EP | 1 493 604 A2 | 1/2005 |
| JP | 2005-137135 A | 5/2005 |
| WO | WO 2007/094278 A1 | 8/2007 |

OTHER PUBLICATIONS

European Search Report dated Apr. 8, 2014 for Application No. 14 15 0432.

*Primary Examiner* — Todd Melton
(74) *Attorney, Agent, or Firm* — Birch, Stewart, Kolasch & Birch, LLP

(57) ABSTRACT

An engine operation control device for a hybrid vehicle, including: an engine provided in a vehicle; a power generator that is driven by the engine to generate electric power; a driving battery that is chargeable with electric power supplied from the power generator; and a front motor and a rear motor that drive wheels with electric power supplied from the driving battery or the power generator, and allowing a series mode in which the front motor drives front wheels and the rear motor drives rear wheels while the engine is operated at a predetermined set rotational speed to drive the power generator to generate electric power, wherein the set rotational speed is set to increase with decreasing of the atmospheric pressure in a present position of the vehicle in the series mode.

6 Claims, 3 Drawing Sheets

(56) References Cited

U.S. PATENT DOCUMENTS 7,918,762 B2 * 4/2011 Muta et al. ................... 477/97
8,146,692 B2 * 4/2012 Kikuchi ................... 180/65.29
2005/0228553 A1 10/2005 Tryon
2008/0147259 A1 6/2008 Choi
2012/0143416 A1 * 6/2012 Park et al. ................... 701/22

* cited by examiner

ENGINE OPERATION CONTROL DEVICE FOR HYBRID VEHICLE

BACKGROUND OF THE INVENTION

1. Field of the Invention

The present invention relates to an engine operation control technique in a series mode of a hybrid vehicle.

2. Description of the Related Art

Among recently developed hybrid vehicles, a vehicle has been known that allows a series mode in which a power generator is driven by an engine to generate electric power, and an electric motor causes travel driving.

In the series mode, only the electric motor drives drive wheels of the vehicle, and thus a rotational speed of the engine can be arbitrarily set irrespective of variations in traveling speed.

Generally, in the series mode, operation points (rotational speed, output torque) of an engine are set to values with low fuel consumption efficiency while ensuring an output (generated electric power) required by a power generator.

Further, a hybrid vehicle has been known in which an operation point of an engine in a series mode is changed. For example, Japanese Patent Laid-Open No. 2005-137135 proposes a technique of setting an operation point of an engine in a series mode based on a state of charge of a driving battery that supplies electric power to an electric motor, and maintaining the state of charge of the driving battery within a predetermined range.

However, in highlands with low atmospheric pressure, maximum output torque of an engine decreases. Thus, setting the operation point of the engine under conditions of flatlands (lowlands) may make it difficult to drive a power generator so as to ensure an output. Then, setting the operation point of the engine so as to ensure an output even in a highest altitude set in an area of use of a vehicle may unnecessarily increase a rotational speed of the engine in lowlands and thereby reduce fuel efficiency.

SUMMARY OF THE INVENTION

The present invention is achieved to solve the above described problem, and has an object to provide an engine operation control device for a hybrid vehicle that can appropriately set an operation point of an engine in a series mode and can increase fuel efficiency.

To achieve the object, the present invention provides an engine operation control device for a hybrid vehicle, comprising: an engine provided in a vehicle; a power generator that is driven by the engine to generate electric power; a driving battery that is chargeable with electric power supplied from the power generator; a driving motor that drives drive wheels with electric power supplied from the driving battery or electric power supplied from the power generator; a mode switching unit for switching a travel mode of the vehicle to a series mode in which the driving motor drives the drive wheels to cause the vehicle to travel while the engine is operated at a predetermined set rotational speed to cause the power generator to generate electric power; an atmospheric pressure detection unit for detecting atmospheric pressure in a present position of the vehicle; and a setting unit for setting a rotational speed of the engine so that the set rotational speed increases with decreasing of the atmospheric pressure detected by the atmospheric pressure detection unit in the series mode.

Thus, the set rotational speed of the engine in the series mode increases with decreasing atmospheric pressure in the present position of the vehicle. Thus, even if maximum output torque of the engine decreases with decreasing atmospheric pressure, the rotational speed can be increased to ensure an output of the engine and ensure an output (generated electric power) of the power generator. Also, when the atmospheric pressure is relatively high, the rotational speed of the engine can be limited to increase fuel efficiency and reduce engine noise.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Now, an embodiment of the present invention will be described with reference to the drawings.

Figure 1:
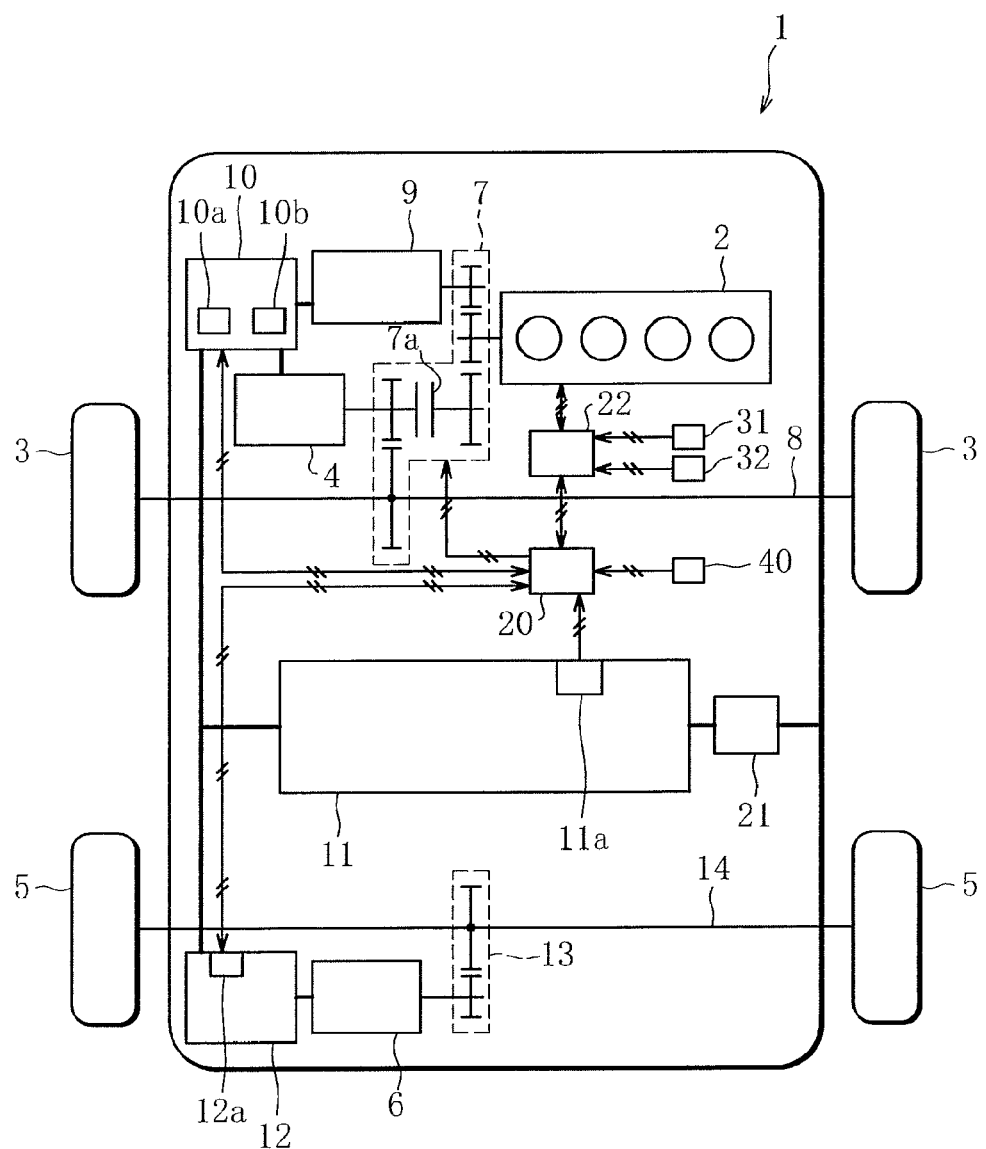
FIG. 1 is a schematic diagram of a plug-in hybrid vehicle according to an embodiment of the present invention.

FIG. 1 is a schematic diagram of a plug-in hybrid vehicle (hereinafter referred to as vehicle 1) according to an embodiment of the present invention.

The vehicle 1 of this embodiment is a four-wheel-drive vehicle that can travel by driving front wheels 3 using an output of an engine 2, and includes an electric front motor 4 (driving motor) that drives the front wheels 3, and an electric rear motor 6 (driving motor) that drives rear wheels 5.

The engine 2 can drive a drive axle 8 of the front wheels 3 via a reducer 7, and drive a power generator 9 via the reducer 7 to generate electric power.

The front motor 4 is driven by electric power of a high voltage supplied from a driving battery 11 and the power generator 9 included in the vehicle 1 via a front inverter 10 to drive the drive axle 8 of the front wheels 3 via the reducer 7. The reducer 7 includes a clutch 7a that can connect/disconnect transmission of power between an output shaft of the engine 2 and the drive axle 8 of the front wheels 3.

The rear motor 6 is driven by electric power of a high voltage supplied from the driving battery 11 and the power generator 9 via a rear inverter 12 to drive a drive axle 8 of the rear wheels 5 via the reducer 7.

The electric power generated by the power generator 9 can charge the driving battery 11 via the front inverter 10, and can be supplied to the front motor 4 and the rear motor 6.

The driving battery 11 includes a secondary battery such as a lithium-ion battery, has a battery module (not shown) including a plurality of battery cells together, and further includes a battery monitoring unit 11a that monitors a state of charge (SOC) and the like of the battery module.

The front inverter 10 includes a front motor control unit 10a and a generator control unit 10b. The front motor control unit 10a controls an output of the front motor 4 based on a control signal from a hybrid control unit 20 (setting unit, mode switching unit). The generator control unit 10b has a function of controlling an amount of electric power generation of the power generator 9 based on a control signal from the hybrid control unit 20.

The rear inverter 12 includes a rear motor control unit 12a. The rear motor control unit 12a has a function of controlling an output of the rear motor 6 based on a control signal from the hybrid control unit 20.

Also, the vehicle 1 includes a charger 21 that charges the driving battery 11 using an external power supply.

An engine control unit 22 that controls driving of the engine 2 has a function of inputting intake pressure and an intake temperature from an intake pressure sensor 31 (atmospheric pressure detection unit) that detects intake pressure of the engine 2 and an intake temperature sensor 32 (intake temperature detection unit) that detects an intake temperature, and calculating maximum possible torque Mmax at a present rotational speed N of the engine 2.

The hybrid control unit 20 is a control device for generally controlling the vehicle 1, and includes an input/output device, a storage device (ROM, RAM, nonvolatile RAM, or the like), a central processing unit (CPU), a timer, or the like.

To an input side of the hybrid control unit 20, the battery monitoring unit 11a of the driving battery 11, the front motor control unit 10a and the generator control unit 10b of the front inverter 10, the rear motor control unit 12a of the rear inverter 12, the engine control unit 22, and an accelerator opening sensor 40 that detects an amount of accelerator operation are connected, and detection and actuation information from these instruments are input.

On the other hand, to an output side of the hybrid control unit 20, the front motor control unit 10a and the generator control unit 10b of the front inverter 10, the rear motor control unit 12a of the rear inverter 12, the reducer 7 (clutch 7a), and the engine control unit 22 are connected.

The hybrid control unit 20 calculates a vehicle requested output P required for travel driving of the vehicle 1 based on various detection amounts and various kinds of actuation information described above from the accelerator opening sensor 40 or the like, sends a control signal to the engine control unit 22, the front motor control unit 10a, the generator control unit 10b, the rear motor control unit 12a, and the reducer 7, to control switching among travel modes (for example, an electric vehicle (EV) mode, a series mode, and a parallel mode), outputs of the engine 2, the front motor 4 and the rear motor 6, and an output (generated electric power) of the power generator 9.

In the EV mode, the engine 2 is stopped, and the front motor 4 and the rear motor 6 are driven by electric power supplied from the driving battery 11 to cause the vehicle to travel.

In the series mode, the clutch 7a in the reducer 7 is disconnected, and the engine 2 actuates the power generator 9. The front motor 4 and the rear motor 6 are driven by electric power generated by the power generator 9 and electric power supplied from the driving battery 11 to cause the vehicle to travel. In the series mode, the rotational speed of the engine 2 is set to a set rotational speed Ns, and electric power generated by excess power is supplied to the driving battery 11 to charge the driving battery 11.

In the parallel mode, the clutch 7a in the reducer 7 is connected, and power is mechanically transmitted from the engine 2 via the reducer 7 to drive the front wheels 3. The front motor 4 and the rear motor 6 are driven by electric power generated by the power generator 9 actuated by the engine 2 and electric power supplied from the driving battery 11 to cause the vehicle to travel.

The hybrid control unit 20 switches the travel mode to the parallel mode in a region with high efficiency of the engine 2, such as a high speed region. In regions other than the parallel mode, that is, middle and low speed regions, the travel mode is switched between the EV mode and the series mode based on the state of charge SOC of the driving battery 11.

Further, the hybrid control unit 20 has a function of forcedly driving the engine 2 to generate electric power and charge the driving battery 11 when the state of charge SOC of the driving battery 11 is lower than an allowable range.

This embodiment has a feature in setting of an operation point of the engine 2 in the series mode. The operation point of the engine 2 is defined by the set rotational speed Ns and the output torque T of the engine 2. The hybrid control unit 20 sets the set rotational speed Ns and the output torque T of the engine 2 based on a requested output required for driving the power generator 9, and has a function of changing the set rotational speed Ns based on an operation environment (atmospheric pressure or the like) of the engine 2 in this embodiment.

The hybrid control unit 20 inputs the maximum possible torque Mmax at the present rotational speed N of the engine 2 from the engine control unit 22, and divides the maximum possible torque Mmax by the larger of standard state maximum torque Tmax at the rotational speed N and 1 to calculate an environmental correction coefficient C as in the following expression (1).

$$C = Mmax/\max(1(Nm), Tmax) \quad (1)$$

The standard state maximum torque Tmax is maximum output torque of the engine 2 in a standard state (flatland (for example, atmospheric pressure of 760 mmHg) and a reference temperature (for example, 27° C.)). The standard state maximum torque Tmax corresponding to the rotational speed of the engine 2 is previously stored in the hybrid control unit 20 as a map.

Then, the hybrid control unit 20 sets the set rotational speed Ns of the engine 2 in the series mode based on the environmental correction coefficient C.

More specifically, the set rotational speed Ns of the engine 2 in the series mode is set between a reference engine rotational speed Ns1 and a highland set rotational speed Nsh using the environmental correction coefficient C as in the following expression (2).

$$Ns = C \times Ns1 + (1-C) \times Nsh \quad (2)$$

The reference engine rotational speed Ns1 is a set rotational speed Ns set in the standard state, and the highland set rotational speed Nsh is a set rotational speed Ns set with a highest altitude previously defined in the area of use of the vehicle 1 as an operation environment. The reference engine rotational speed Ns1 and the highland set rotational speed Nsh are previously stored in the hybrid control unit 20.

By controlling as described above, the operation environment of the engine 2 including atmospheric pressure is estimated as the environmental correction coefficient C based on a ratio between the standard state maximum torque Tmax at the present rotational speed N of the engine 2 and the maximum possible torque Mmax input from the engine control unit 22. The environmental correction coefficient C is used to set the set rotational speed Ns of the engine 2 in the series mode between the reference engine rotational speed Ns1 and the highland set rotational speed Nsh in a standard state (for flatlands).

Figure 2:
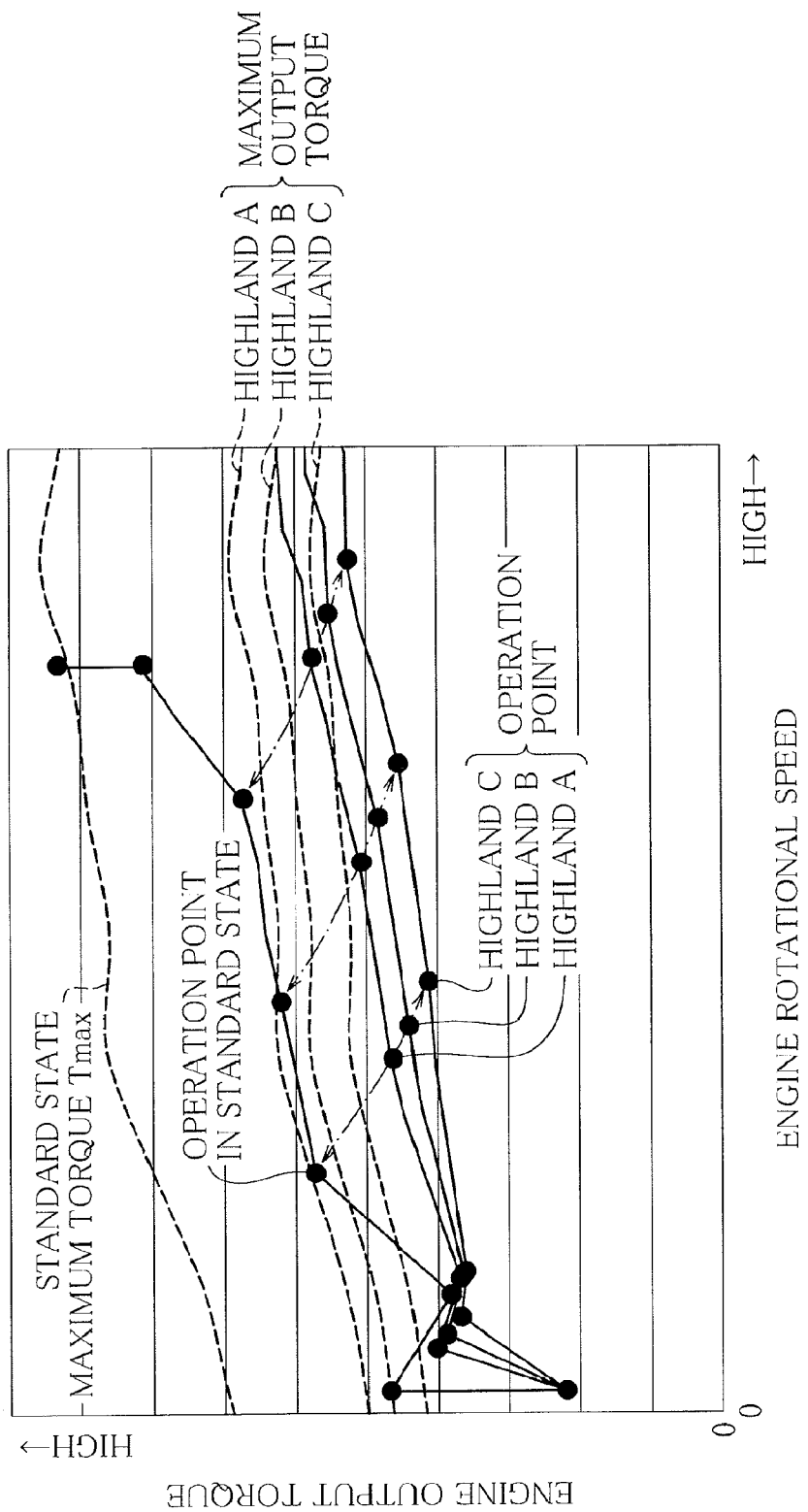
FIG. 2 is a graph showing an example of a setting state of operation points of an engine in this embodiment.

FIG. 2 is a graph showing an example of a setting state of operation points of the engine 2. An axis of abscissa in the graph in FIG. 2 represents the rotational speed of the engine 2, and an axis of ordinate represents the output torque of the engine 2, and operation points of the engine 2 in the series mode are shown in the standard state (atmospheric pressure of 760 mmHg) and in highest altitudes set for respective areas of use (for example, highland A: atmospheric pressure of 550 mmHg, highland B: atmospheric pressure of 510 mmHg, highland C: atmospheric pressure of 460 mmHg). In FIG. 2, solid lines show operation points depending on a requested output of the engine 2 in each operation environment (atmospheric pressure), and broken lines show maximum output torque of the engine 2 in each operation environment.

As shown in FIG. 2, the maximum output torque of the engine 2 significantly differs depending on atmospheric pressure. Corresponding thereto, in this embodiment, the highland set rotational speed Nsh differs depending on areas of use of the vehicle 1, and the environmental correction coefficient C is changed depending on atmospheric pressure as described above. Thus, the set rotational speed Ns of the engine 2 is changed as shown by dash-single-dot lines in FIG. 2 between a flatland and a highland while ensuring the output of the engine 2 (output torque×rotational speed).

As such, the set rotational speed Ns of the engine 2 set depending on an output required for generating electric power in the series mode is controlled to increase with decreasing atmospheric pressure, increase so as to compensate for a decrease in the maximum output torque of the engine 2 with decreasing atmospheric pressure, and ensure a required output. Thus, in a flatland with relatively high atmospheric pressure, the set rotational speed Ns of the engine 2 can be limited to increase fuel efficiency.

In this embodiment, the maximum possible torque Mmax input from the engine control unit 22 to the hybrid control unit 20 is used to calculate the environmental correction coefficient C, thereby allowing setting of the set rotational speed Ns including the atmospheric pressure and other operation environment (intake temperature, friction, or the like) of the engine 2. It is not necessary that the intake pressure detected by the intake pressure sensor 31 is newly transmitted from the engine control unit 22 to the hybrid control unit 20, and an amount of information transmitted from the engine control unit 22 to the hybrid control unit 20 can be reduced.

Figure 3:
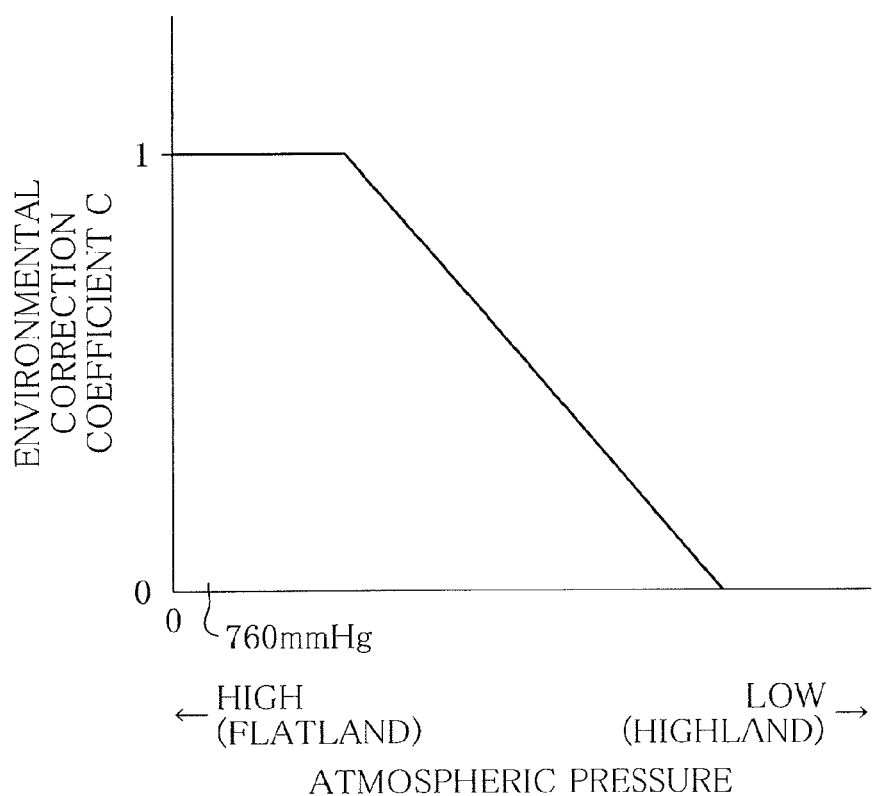
FIG. 3 is a graph showing an example of setting of an environmental correction coefficient in this embodiment.

FIG. 3 is a graph showing an example of setting of the environmental correction coefficient C.

In the above described embodiment, the environmental correction coefficient C is calculated by the expression (1), and the environmental correction coefficient C uniformly decreases with decreasing atmospheric pressure. However, as shown in FIG. 3, a region with a substantially constant environmental correction coefficient C close to predetermined flatland air pressure (760 mmHg) is preferably provided rather than the environmental correction coefficient C uniformly decreases with decreasing atmospheric pressure.

As such, the region with a substantially constant environmental correction coefficient C is provided close to the flatland, and thus the set rotational speed No of the engine 2 is also set to a substantially constant value in this region. Thus, in the flatland with relatively high maximum output torque and high frequency of use of the vehicle 1, changes in the set rotational speed Ns of the engine 2 in the series mode are limited, and variations in engine noise are reduced, thereby increasing comfort of an occupant. On the other hand, in a highland, the environmental correction coefficient C decreases with decreasing atmospheric pressure to increase the rotational speed of the engine 2, thereby ensuring the output of the engine 2.

The present invention is not limited to the above described embodiment. For example, the intake pressure detected by the intake sensor 31 may be input to the hybrid control unit 20 to set an environmental correction coefficient C based on the intake pressure and set a set rotational speed Ns.

The maximum output torque of the engine 2 also changes depending on the intake temperature. Thus, if the set rotational speed Ns is set based on the intake pressure as described above, the environmental correction coefficient C may be further corrected to decrease with increasing intake temperature detected by the intake temperature sensor 32 (intake temperature detection unit) of the engine 2 to increase the set rotational speed Ns of the engine 2. Such a correction depending on the intake temperature can more accurately ensure the output of the engine 2 for driving the power generator 9, and set a lower set rotational speed Ns of the engine 2, thereby further increasing fuel efficiency.

The maximum output torque also changes depending on the friction of the engine 2. Thus, the hybrid control unit 20 may further correct the set rotational speed Ns in the series mode depending on the friction. More specifically, the environmental correction coefficient C is reduced with increasing friction, and the set rotational speed Ns is set to increase. The friction of the engine 2 is generally calculated by the engine control unit 22 (friction estimation unit), and thus this information may be used. Such a correction depending on the friction can more accurately ensure the output of the engine 2 for driving the power generator 9, and set a lower set rotational speed Ns of the engine 2, thereby further increasing fuel efficiency.

The maximum output torque of the engine 2 is particularly significantly influenced by the atmospheric pressure. Thus, the environmental correction coefficient C is set depending on the above described atmospheric pressure, and further in combination with the intake temperature and the friction as described above, the set rotational speed Ns is set, thereby allowing more appropriate setting of the set rotational speed Ns of the engine 2.

In this embodiment, the present invention is applied to a plug-in hybrid vehicle that allows switching among the EV mode, the series mode, and the parallel mode, but may be widely applied to a hybrid vehicle that allows at least the series mode.

What is claimed is:

1. An engine operation control device for a hybrid vehicle, comprising:
    an engine provided in a vehicle;
    a power generator that is driven by the engine to generate electric power;
    a driving battery that is chargeable with electric power supplied from the power generator;
    a driving motor that drives drive wheels with electric power supplied from the driving battery or electric power supplied from the power generator;
    a clutch that transmits or ceases to transmit power from the engine to the drive wheels;
    a mode switching unit for switching a travel mode of the vehicle to a series mode in which the driving motor drives the drive wheels to cause the vehicle to travel while the engine is operated at a predetermined set rotational speed to cause the power generator to generate electric power, with the clutch disengaged;
    an atmospheric pressure detection unit for detecting atmospheric pressure in a present position of the vehicle; and
    a setting unit for setting a rotational speed and output torque of the engine so that the set rotational speed increases and the engine output torque decreases with decreasing of the atmospheric pressure detected by the atmospheric pressure detection unit to ensure that the power generator generates required electric power in the series mode.

2. The engine operation control device for a hybrid vehicle according to claim 1, wherein
the setting unit sets the set rotational speed to a constant value in a region with flatland air pressure.

3. The engine operation control device for a hybrid vehicle according to claim 2, wherein
the engine operation control device further comprises an intake temperature detection unit for detecting an intake temperature of the engine, and
the setting unit sets the set rotational speed so as to increase with increasing of the intake temperature of the engine detected by the intake temperature detection unit.

4. The engine operation control device for a hybrid vehicle according to claim 2, wherein
the engine operation control device further comprises a friction estimation unit for estimating friction of the engine, and
the setting unit sets the set rotational speed so as to increase with increasing friction of the engine detected by the friction estimation unit.

5. The engine operation control device for a hybrid vehicle according to claim 1, wherein
the engine operation control device further comprises an intake temperature detection unit for detecting an intake temperature of the engine, and
the setting unit sets the set rotational speed so as to increase with increasing of the intake temperature of the engine detected by the intake temperature detection unit.

6. The engine operation control device for a hybrid vehicle according to claim 1, wherein
the engine operation control device further comprises a friction estimation unit for estimating friction of the engine, and
the setting unit sets the set rotational speed so as to increase with increasing friction of the engine detected by the friction estimation unit.

\* \* \* \* \*